Aug. 27, 1968    J. C. MACK    3,399,370

SHAFT SEAL

Filed Dec. 30, 1966    2 Sheets-Sheet 1

*INVENTOR.*
JOHN C. MACK

BY *Matthew P. Lynch*
*Robert J. McDonnell*
HIS ATTORNEYS

Aug. 27, 1968   J. C. MACK   3,399,370
SHAFT SEAL
Filed Dec. 30, 1966   2 Sheets-Sheet 2

INVENTOR.
JOHN C. MACK
BY Matthew P. Lynch
Robert J. McDonnell
HIS ATTORNEYS

United States Patent Office 3,399,370
Patented Aug. 27, 1968

3,399,370
SHAFT SEAL
John C. Mack, Westtown, Pa., assignor to The Boeing Company, Seattle, Wash., a corporation of Delaware
Filed Dec. 30, 1966, Ser. No. 606,307
10 Claims. (Cl. 339—8)

ABSTRACT OF THE DISCLOSURE

A fluid seal for a rotating shaft wherein the natural frequency of the seal is below the vibratory frequency generated by shaft eccentricities and the seal is mounted about the shaft in a manner such that it is not subject to the dynamic eccentricities of the rotating shaft.

---

When a rotating shaft extends through a partition having a pressure differential on opposite sides thereof or different atmospheres on opposite sides thereof, a fluid seal is required to prevent leakage between the shaft and the opening in the partition through which it extends. One example of such a fluid seal is an oil seal to retain the oil within a transmission housing.

Since a rotating shaft is subjected to dynamic eccentricities, the permanent attachment of the seal to either the partition or the shaft subjects to seal to the dynamic eccentricities of the shaft whereby wear occurs on the seal. While it has previously been suggested to mount the seal on a resilient member attached to the shaft, this does not prevent the seal from being subjected to the dynamic eccentricities of the shaft. Thus, the dynamic eccentricities of the shaft are still transmitted to the seal to cause wear thereof.

Thus, in the prior fluid seals for rotating shafts, the seal has been subjected to the dynamic eccentricities of the shaft. As a result, the seal has either malfunctioned or had sporadic loading so as to cause premature removal thereof. This has created relatively high maintenance costs and required refilling of the fluid within the housing at frequent, regular intervals because of the leakage through the seal.

The present invention satisfactorily overcomes this problem by mounting a fluid seal so that it is not subjected to the dynamic eccentricities of the rotating shaft being sealed. This is accomplished by mounting the rotating sealing portion of the fluid seal so that it rotates in relative isolation from the rotating shaft, which is to be sealed, with respect to the dynamic eccentricities of the shaft. In one embodiment, the components of the rotating portion of the fluid seal comprise an annular member, springs supporting the annular member in spaced relation to the shaft, and an impervious diaphragm with a substantially zero spring rate to seal the space between the annular member and the shaft.

Careful selection of the components of the rotating sealing portion of the fluid seal permits this relative isolation. That is, these components are chosen so that the natural frequency of the annular member and the springs is below the vibratory frequency generated by the shaft eccentricities. The effect of this selection of components is to minimize magnification of the effect of the shaft eccentricities to a point where the annular member is essentially isolated from the dynamic eccentricities of the shaft. The annular member, which has been carefully manufactured to be concentric around its center of mass, will rotate relatively free of dynamic eccentricities. Since the annular member is mounted in concentric relationship with the fixed portion of the seal, there is no uneven wear on the fixed portion of the seal.

Accordingly, the present invention permits the sealing surface of the rotating part of the seal to maintain its concentricity and squareness irrespective of the dynamic eccentricities of the rotating shaft with which the seal cooperates. As a result, the time intervals for refilling the transmission, for example, may either be eliminated or spaced further apart. Similarly, the present invention produces a reduced maintenance cost of the oil seal.

An object of this invention is to provide a driven member that is isolated from its driving shaft so that it is not subjected to the dynamic eccentricities of its drawing shaft.

Another object of this invention is to provide a fluid seal that is not subjected to the dynamic eccentricities of the shaft being sealed.

A further object of this invention is to provide a fluid seal in which the rotating sealing surface operates at a speed whereby it is isolated from the driving shaft.

Still another object of this invention is to provide a fluid seal in which the rotating sealing surface maintains its initial installed concentricity and squareness.

Other objects of this invention will be readily perceived from the following description, claims, and drawings.

This invention relates to the combination of a member having an opening therein with a rotating shaft extending therethrough. The shaft is surrounded by annular means, which is connected by suitable means to the shaft for rotation therewith. The connecting means supports the annular means in spaced relation to the shaft and is selected together with the annular means so that the natural frequency of these components is below the vibratory frequency caused by dynamic eccentricities of the shaft when the shaft rotates in a selected speed range. The member has means adjacent the opening for cooperation with a surface on the annular means to permit relative rotation therebetween.

The attached drawings illustrate preferred embodiments of the invention, in which.

Figure 1:
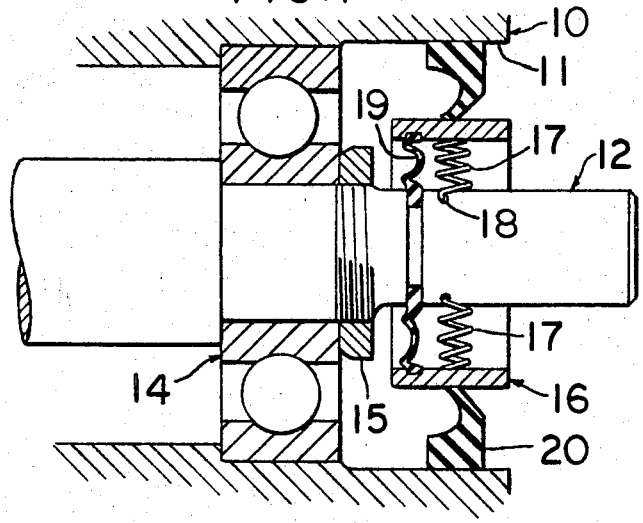
FIGURE 1 is a section view of one form of the rotating structure of the present invention in which the rotating structure functions as a fluid seal.

Referring to the drawings and particularly FIGURE 1, there is shown a housing 10 having a circular opening 11 formed therein through which a rotating shaft 12 extends. The axis of rotation of the shaft 12 is substantially coaxial with the center of the opening 11 in the housing 10 whereby the shaft 12 is concentric with the circuit opening 11.

A bearing assembly 14 supports the shaft for rotation within the housing 10. A nut 15, which is threaded on the shaft 12, retains the bearing assembly 14 in position.

An annular member 16 is mounted in surrounding relationship to the shaft 12 by a plurality of angularly spaced coil springs 17. One end of each of the springs 17 is fixedly attached to the shaft by a screw 18 or the like while its other end is fixedly attached to the inner surface of the annular member 16.

An impervious diaphragm 19, which has a substantially zero spring rate, is fixedly secured to the shaft 12 and to the annular member 16 to prevent fluid leakage therebetween. An annular lip seal 20 is secured to the housing 10 for cooperation with the outer, annular surface of the annular member 16 to form a fluid seal therebetween. The seal 20 is concentric with the opening 11 in the housing 10.

The mass of the annular member 16 is selected along with the spring rate of the support springs 17 so that the annular member 16 does not respond to dynamic eccentricities of the rotating shaft 12. Thus, the annular member 16 rotates concentric to the lip seal 20 whereby there is no deflection in the seal 20 to cause premature wear thereof as occurs with seals subjected to the dynamic eccentricities of a rotating shaft.

It is necessary for the annular member 16 to be machined concentric with its mass center. This is to insure that the annular member 16, when its mass is properly selected and the spring rate of the springs 17 is properly determined, will rotate about its mass center rather than the axis of rotation of the shaft 12.

While normally accurate machining practice will usually produce an annular member concentric with its mass center, it may be desirable to machine the annular member upon its isolated support so as to allow the annular member to find its own unconstrained position during machining. This will insure that the annular member is concentric with its mass center.

If normally accurate machining practices were not satisfactory because of radial and tangential forces, electrochemical removal of material from the outer surface of the annular member could be employed while the annular member was rotated at a speed above the natural frequency of the spring suspension system of the annular member. In electrochemical removal of the metal, the annular member 16 would be the workpiece and form an anode while the work tool would form the cathode with an electrolytic bath flowing over both elements to complete a circuit. In electrochemical machining, the work tool would not engage the annular member 16 so that there would not be any radial or tangential machining force upon the annular member during machining thereof to form the annular member 16 concentric with its mass center.

Figure 5:
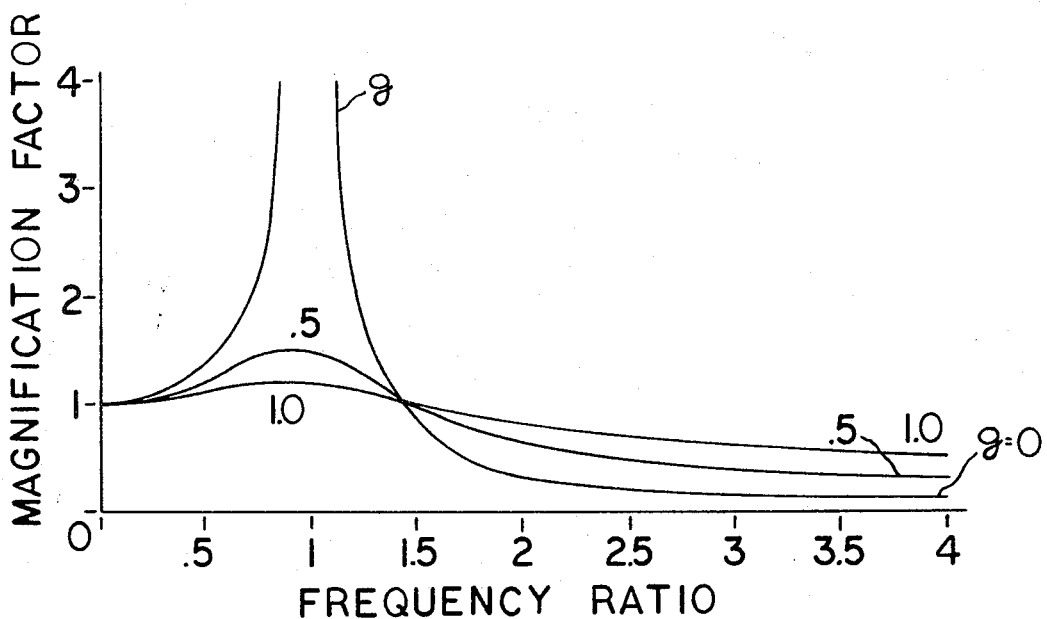
FIGURE 5 is a graph for use in selecting the mass of the rotating member and the spring rate of the system suspending the rotating member in spaced relation to its drive shaft.
Figure 6:
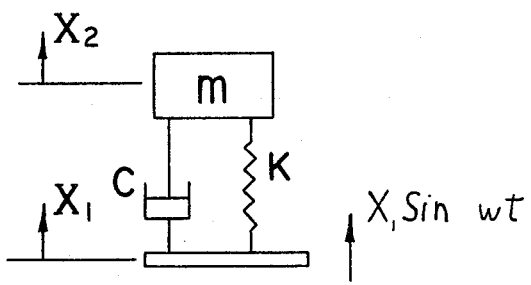
FIGURE 6 is a schematic view showing relationships employed to select the proper mass of the rotating member and the spring rate of the system suspending the rotating member in spaced relation to its drive shaft.

Referring to FIGURES 5 and 6, the method of selecting the mass of the annular member 16 and the spring rate of the support springs 17 will be explained. This is the theoretical approach to properly proportioning the mass of the annular member 16 and the suspension spring rate of the support springs 17 with regard to the speed of the shaft 12. The objective is to minimize the amplitude $X_2$ of the annular member 16 with respect to the amplitude $X_1$ of the run out or dynamic eccentricities of the shaft 12 for a given speed $\omega$ of the shaft 12 through a proper choice of the spring rate K of the support springs 17 and the mass $m$ of the annular member 16.

Referring to FIGURE 6, $X_1$, $X_2$, K, and $m$ are shown. There is also shown C, which indicates the damping imposed upon the annular member 16 by the seal. $C_c$ is the initial damping value. With $X_1$ and $X_2$ in inches, K is in pounds per inch, $m$ is in pounds-seconds$^2$ per inch with C and $C_c$ being in pound-seconds per inch.

Another factor involved in providing a solution is the natural frequency $\omega_n$ of the annular member 16, and $\omega_n$ is equal to $(K/m)^{1/2}$. A further factor is the critical damping coefficient $g$ imposed upon the annular member 16, and $g$ is equal to $C/C_c$, which is equal to $C/2(K/m)^{1/2}$. Still another factor is the frequency ratio $r$, which is equal to $\omega/\omega_n$. Both $\omega$ and $\omega_n$ are in radians per second.

By summing all the forces acting on the mass $m$, the equation of motion is:

$$m\ddot{X}_2 + C(\dot{X}_2 - \dot{X}_1) + K(X_2 - X_1) = 0$$

This may be rearranged as $$m\ddot{X}_2 + C\dot{X}_2 + KX_2 = KX_1 + C\dot{X}_1 \qquad (1)$$

By assuming the shaft motion as $$X_1 = X_1 \sin \omega t \qquad (2)$$

and substituting Equation 2 into Equation 1, there is obtained $$m\ddot{X}_2 + C\dot{X}_2 + KX_2 = X_1(K \sin \omega t + Cx \cos \omega t)$$

or $$m\ddot{X}_2 + C\dot{X}_2 + KX_2 = X_1(K^2 + C^2\omega^2)^{1/2} \sin(\omega t + G) \qquad (3)$$

where $$G = \tan^{-1} Cw/K = \tan^{-1} 2gr \qquad (4)$$

The steady state solution of Equation 3 is $$X_2 = X_1(1+(2gr)^2)^{1/2}/((1-r^2)^2 + (2gr)^2)^{1/2} \sin(\omega t - p + G) \qquad (5)$$

where $$p = \tan^{-1} 2gr/1 - r^2 \qquad (6)$$

Equation 5 may be rewritten as $X_2 = X_2 \sin(\omega t - p + G)$ where $X_2$ is the displacement amplitude of the annular member 16.

Hence, $$X_2 = X_1(1+(2gr)^2/(1-r^2)^2+(2gr)^2)^{1/2}$$

The magnification factor $k$ is equal to $X_2/X_1$. Thus, $$k = (1+(2gr)^2/(1-r^2)^2+(2gr)^2)^{1/2} \qquad (7)$$

Equation 7 may be plotted as shown in FIGURE 5.

In designing the annular member 16 and the spring rate of the support springs 17, the first step is to decide to value of the magnification factor $k$. Then, the value of the critical damping coefficient $g$ imposed upon the annular member 16 should be selected for the material being used in the seal. The material of the seal member 20 should be selected so that $g$ is as small as possible.

With the selected values of $g$ and $k$, the corresponding frequency ratio $r$ may be determined from FIGURE 5. with $r = \omega/\omega_n$ and $\omega_n^2 = K/m$, $K = (\omega^2/r^2)m$. This gives the relation of the spring rate K of the springs 17 to the mass $m$ of the annular member 16.

As an example, with the magnification factor $k$ equal to 0.2, the critical damping coefficient $g$ imposed upon the annular member 16 equal to zero, and the shaft rotating at a speed $\omega$ of 6,000 r.p.m. (which is 628.32 radians per second), FIGURE 5 shows that the frequency ratio $r$ is 2.5.

Since $K = (\omega^2/r^2)m$, then $K = (628.32^2/2.5^2)m$ or $K = 63,165.763m$. If the weight of the annular member 16 is ten pounds, then $m$ equals 10/386 lb.-sec.$^2$/in. Accordingly, $K = 1636$ pounds per inch.

Thus, the mass of the annular member 16 and the spring rate of the support springs 17 are directly proportional to each other. Thus, for example, if the weight of the annular member 16 were one pound rather than ten pounds, then the spring rate of the support springs 17 would be 163.6 pounds per inch.

Figure 2:
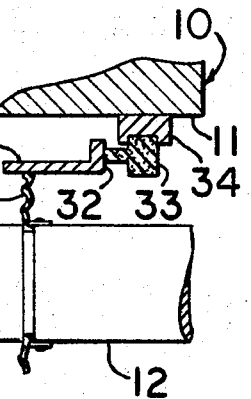
FIGURE 2 is a sectional view showing another embodiment of the rotating structure of the present invention in which the rotating structure functions as a fluid seal.

Referring to FIGURE 2, there is shown another modification of the invention in which a diaphragm 30 is attached to the shaft 12. The diaphragm 30 has its other end connected to an annular member 31. The annular member 31 has an annular surface 32 for cooperation with a conventional carbon-graphite face seal 33, which is supported by the housing 10 and concentric with the opening 11.

The diaphragm 30 is not only impervious but also has the required spring rate to resiliently support the annular member 31 with respect to the shaft 12 so that the dynamic eccentricities of the shaft 12 are not transmitted to the annular member 31. The diaphragm 30 may be formed of any suitable material, which is impervious to fluid, has the desired spring rate, and is flexible. One example would be an elastomeric material.

The spring rate K of the diaphragm 30 would be selected in the same manner as the prior example for the springs 17 of FIGURE 1. Of course, the mass $m$ would be the mass of the annular member 31.

Accordingly, the modification of FIGURE 2 also prevents transmission of the dynamic eccentricities of the shaft 12 to the annular member 31. Thus, the seal 33 is not subjected to any wear due to the dynamic eccentricities of the shaft 12.

Figure 3:
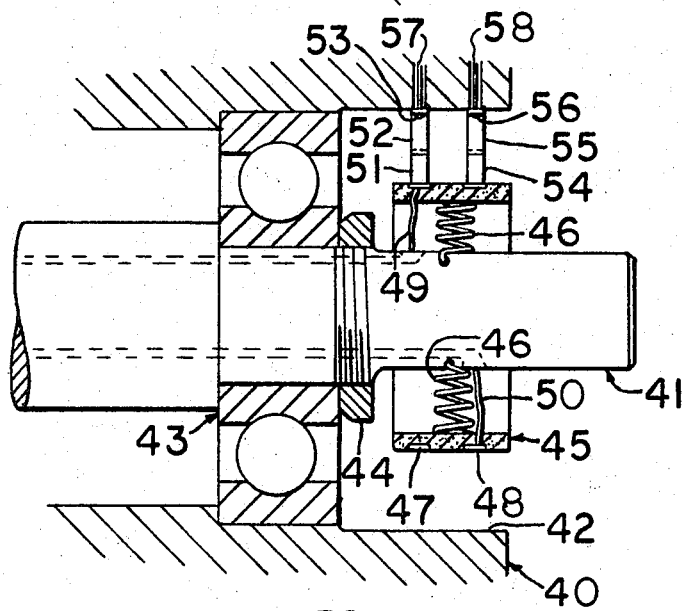
FIGURE 3 is a sectional view of another modification of the rotating structure of the present invention in which the rotating structure is employed to transmit electrical signals.
Figure 4:
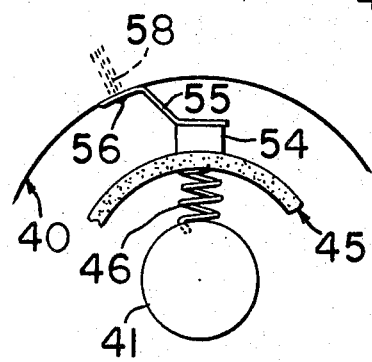
FIGURE 4 is an end elevation view of the structure of FIGURE 3.

Referring to FIGURES 3 and 4, there is shown a housing 40 having a shaft 41 extending through a circular opening 42 in the housing 40. The shaft 41 has its rotating axis substantially coaxial with the center of the opening 42 whereby the shaft 41 is concentric with the opening 42. The shaft 41 is supported for rotation within the housing 40 by a bearing assembly 43. A nut 44, which is threaded on the shaft 41, retains the bearing assembly 43 in position.

An annular member 45, which is formed of a suitable insulating material, is supported in spaced relation to the rotating shaft 41 by a plurality of angularly spaced coil springs 46. This is similar to the spring suspension system of FIGURE 1.

In the same manner as described for selecting the mass of the annular member 16 and the spring rate of the support springs 17 of the modification of FIGURE 1, similar calculations are made to properly select the mass $m$ of the annular member 45 and the spring rate K of the springs 46. This insures that the annular member 45 rotates about its mass center rather than about the axis of rotation of the shaft 12 whereby the deflections, which are produced by the dynamic eccentricities of the shaft 41, are not transmitted to the annular member 45.

The annular member 45 has electrical conductive rings 47 and 48 formed in its outer surface in spaced relation to each other. The conductive ring 47 is connected through a lead 49 to a suitable electrical source (not shown). Likewise, the conductive ring 48 is connected through a conductor 50 to the same or a different electrical source.

The conductive ring 47 engages a brush or electrical contact member 51, which is supported in spaced relation to the wall of the housing by a spring 52. A screw 53 maintains the spring 52 on the wall of the housing 40.

The conductive ring 48 cooperates with a second brush or electrical contact member 54. The brush 54 is supported in spaced relation to the wall of the housing by a spring 55. The spring 55 is secured by a screw 56 to the wall of the housing 40.

The springs 52 and 53 are electrically conductive members. The screws 53 and 56 have leads 57 and 58, respectively, extending therefrom into the interior of the housing 40.

Accordingly, electrical signals are transmitted through each of the conductive rings 47 and 48 to the brushes 51 and 54, respectively. Since the spring rate of the springs 46 and the mass of the annular member 45 are selected in the same manner as described for the modification of FIGURE 1, the annular member 45 is not subjected to the dynamic eccentricities of the shaft 41.

As a result, radial motion of the conductive rings 47 and 48 is minimized since the annular member 45 rotates concentric to its mass center. Thus, brush bounce, which is detrimental to high fidelity transmittal of electrical signals, is minimized.

The conductive rings 47 and 48 may either be conductive along their entire surface or only in one or more portions. This would be determined by the signal to be transmitted.

It should be understood that the shaft 12 and the shaft 41 may rotate at either a subcritical speed or a supercritical speed. In any of the modifications, the springs connecting the annular member to the shaft prevent transmittal of the dynamic eccentricities of the rotating shaft to the annular member.

Furthermore, while the annular member has been shown as cooperating with a fixedly secured member, it should be understood that it could cooperate with another rotating member, which also would be similarly suspended from its rotating shaft. This would result in two rotating members engaging each other without any deflection occurring therebetween.

While the opening 42 has been described as circular, it should be understood that the opening could be of any shape as long as the shaft 41 could extend therethrough. It is only necessary for the brushes 51 and 54 to have their surfaces, which engage the rings 47 and 48, respectively, concentric with the mass center of the annular member 45.

While each of the shafts has been described as substantially coaxial with the center of the opening through which it extends so as to be concentric thereto, it should be understood that this arrangement is not a requirement. It is only necessary for the mass center of the isolated rotating member and the surface of the member with which it cooperates to be concentric.

An advantage of this invention is that it reduces fluid seal maintenance. Another advantage of this invention is that it permits longer periods of time between refills of a transmission system using the seals of the present invention to seal the rotating shafts of the transmission system. A further advantage of this invention is that it insures that the rotating member, which is suspended by the springs, maintains its desired concentricity and squareness. Still another advantage of this invention is that it permits transfer of electrical signals at high rotating speeds with high fidelity.

For purposes of exemplification, particular embodiments of the invention have been shown and described according to the best present understanding thereof. However, it will be apparent that changes and modifications in the arrangement and construction of the parts thereof may be resorted to without departing from the spirit and scope of the invention.

What is claimed is:

1. In combination, a member having an opening therein, a rotating shaft extending through said opening, annular means surrounding said shaft, means connecting said annular means to said shaft for rotation therewith, said connecting means supporting said annular means in spaced relation to said shaft, said annular means and said connecting means being selected so that the natural frequency thereof is below the frequency of the dynamic eccentricities of said shaft when said shaft rotates in a selected speed range, and said member having means adjacent said opening for cooperation with a surface on said annular means to permit relative rotation therebetween without transmission of any dynamic eccentricities of said shaft.

2. The combination according to claim 1 in which said connecting means is an impervious diaphragm having a pre-determined spring rate.

3. The combination according to claim 1 in which said annular means is an annular member concentric with its mass center and the mass center is concentric with said means of said member.

4. The combination according to claim 2 in which said annular means is an annular member concentric with its mass center and the mass center is concentric with said means of said member.

5. The combination according to claim 1 in which said connecting means comprise a plurality of resilient members and an impervious diaphragm disposed between said shaft and said annular means.

6. The combination according to claim 5 in which said annular means is an annular member concentric with its mass center and the mass center is concentric with said means of said member.

7. The combination according to claim 1 in which said member is a housing, said opening is circular, said means on said housing forms an annular sealing surface, said surface of said annular means is an annular sealing surface, and said sealing surfaces cooperate with each other to form a fluid seal therebetween.

8. The combination according to claim 1 in which said surface of said annular means includes at least one electrically conductive member, said means adajacent said opening on said member has spaced electrical contact members equal in number to said electrically conductive members and aligned therewith, and each of said contact members engaging one of said aligned electrically conductive members to provide an electrical connection therebetween as said shaft rotates.

9. The combination according to claim 7 in which said sealing surface on said housing is a lip-type seal cooperating with said sealing surface of said annular means to form a fluid seal therebetween.

10. The combination according to claim 7 in which said sealing surface on said housing is a carbon-graphite face seal and said sealing surface of said annular means coopertes with said carbon-graphite face seal to form a liquid seal therebetween.

References Cited

UNITED STATES PATENTS 3,124,363  3/1964  Cieslik.

MARVIN A. CHAMPION, *Primary Examiner.*

R. S. STROBEL, *Assistant Examiner.*